3,280,110
SELECTIVE HYDROGENATION OF N-ARALKYL AZIRIDINE
George E. Ham, Lake Jackson, and Prella M. Phillips, Angleton, Tex., assignors to The Dow Chemical Company, Midland, Mich., a corporation of Delaware
No Drawing. Filed Mar. 24, 1965, Ser. No. 442,547
6 Claims. (Cl. 260—239)

This invention relates to the selective hydrogenation of N-substituted aziridinyl compounds which contain an aromatic nucleus.

The hydrogenation of N-substituted aziridines which contain a cyano group using a Raney nickel catalyst has been reported by Bestian in Ann. Chemie, vol. 566, pages 210–244 (1950). Furthermore, Raney nickel has also been used as a catalyst for the reduction of an N-vinyl aziridine intermediate, as disclosed by Lasselle et al. in J. Amer. Chem. Soc., 63, 2374–76 (1941).

It has now been found that the aromatic nucleus of aralkyl N-substituted aziridine compounds may be reduced by hydrogen in the presence of a ruthenium catalysts (such as a ruthenium oxide) without substantial fragmentation or degradation of the starting compounds of products.

The reaction upon which the process of the invention is based may be represented by the following equation (I)

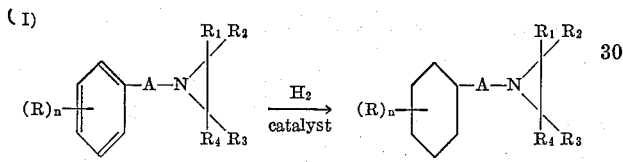

wherein $n$ is an integer of from 0 to 5, each R (which may be the same or different) is an alkyl group of from 1 to 4 carbon atoms, A is an alkylene group of from 1 to 4 carbon atoms of the formula $\textrm{-(C}_k\textrm{H}_{2k}\textrm{)-}$ wherein $k$ is an integer of from 1 to 4 and each of $R_1$, $R_2$, $R_3$ and $R_4$ is independently selected from the group consisting of the hydrogen atom and an alkyl group of from 1 to 4 carbon atoms. In the above formulae, it is to be understood that hydrogen atoms are bonded to all unsubstituted positions on the carbon atoms of the phenyl ring and the cyclohexyl ring. Examples of suitable alkyl groups (R, $R_1$, $R_2$, $R_3$, $R_4$) which may be substituted to the ring carbon atoms of the carbocyclic and heterocyclic groups include methyl, ethyl, n-propyl, i-propyl, n-butyl, sec.-butyl, tert.-butyl and isobutyl radicals. Examples of suitable alkylene groups include methylene and polymethylene groups such as $\textrm{-(CH}_2\textrm{)}_m$ wherein $m$ is an integer of from 1 to 4 as well as branched alkylene groups such as

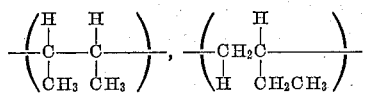

and

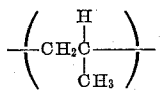

The saturated hydrogenation products may be separated by conventional distillation or chromatographic techniques.

Various embodiments of the process of the invention may be further illustrated by the following typical reactions:

(a)

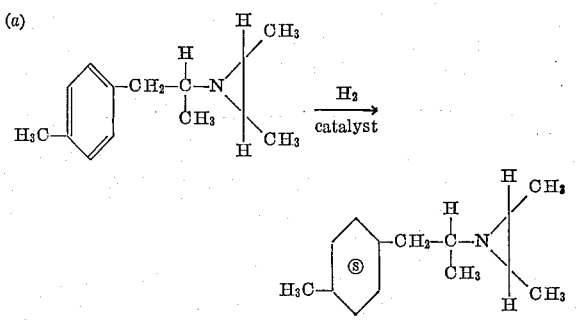

(b)

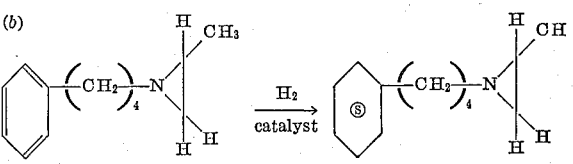

(c)

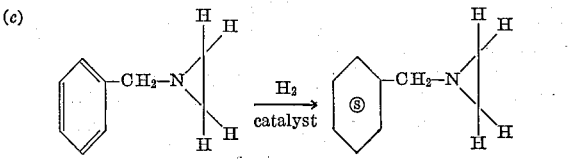

(d)

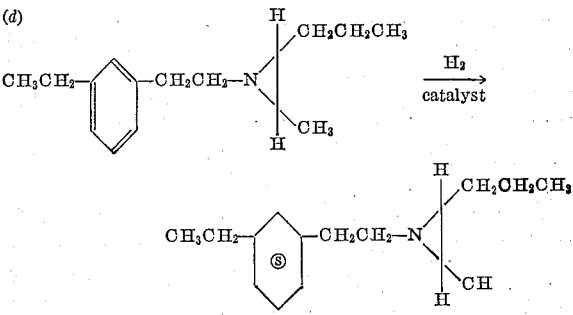

In the preceding equations, the symbol S within a circle means that the ring is completely saturated.

According to the process of the invention, an N-aralkyl aziridine compound is contacted with hydrogen at a temperature of from about 75° to 250° C. under a hydrogen pressure of from about 500 p.s.i.g. to 2000 p.s.i.g. in the presence of a ruthenium metal oxide catalyst (or a ruthenium compound which is at least partially converted to an oxide under the conditions of the reaction) for a time period sufficient to saturate substantially all of the aryl groups of the N-aralkyl aziridine compound without appreciable degradation of the reactants or reaction products. The reaction is preferably carried out in the presence of a catalytic amount of ruthenium dioxide at temperatures of from about 75° to 110° C. (preferably at from 95° to 105° C.) under a hydrogen pressure of from 500 to 2000 p.s.i.g. The reaction may also be carried out at temperatures of from about 100° to 250° C. in the presence of ruthenium dioxide under a hydrogen pressure of from 500 to 2000 p.s.i.g. Reaction times of up to 24 hours may be used. Longer reaction times, however, tend to favor the production of the secondary amines.

Ruthenium dioxide catalyst may be freshly prepared by the dropwise addition of methyl alcohol to a solution of potassium ruthenate in order to precipitate ruthenium dioxide, or commercially available hydrated ruthenium dioxide ($RuO_2 \cdot xH_2O$, $x$=approximately 5) may be used. Mixtures of ruthenium oxides and ruthenium metal may also be employed. Compounds of ruthenium which are at least partially converted to the oxide by exposure to air (usually with heat) may be used as catalysts as well as other oxides such as $Ru_2O_3$. It is preferable to use the catalyst in finely divided form without a support, although any conventional support material which does not interfere with the hydrogenation reaction may be used. Only a catalytic amount of ruthenium oxide is required for the reaction. Amounts of ruthenium oxide of from about .001 to 5.0 percent by weight based upon the weight of the N-aralkyl aziridine compound are generally sufficient.

When the hydrogenation is carried out with a ruthenium oxide catalyst according to the process of the invention, the aryl group is sufficiently saturated under mild hydrogenation conditions without extensive degradation (i.e., the splitting off of smaller molecules with fewer carbon atoms than the starting materials, such as alkylbenzenes and primary amines).

The starting N-aralkyl aziridine compounds may be prepared by the addition of an aziridine compound across the double bond of an aralkene compound (such as by the reaction of styrene and aziridine) or by the reaction of an aralkyl halide (such as benzyl chloride) and aziridine. The saturated aziridine compounds may be polymerized (either thermally or catalytically) and the polymers are useful as adhesives for the preparation of laminated wood, metal and plastic articles. The aziridine compounds may be polymerized by treatment with an acid such as HCl to form products useful as coating materials for wood and fibers.

The following examples are submitted for the purpose of illustration only and are not to be construed as limiting the scope of the invention in any way.

*Example I*

Into a 1410 milliliter stainless steel pressure bomb was placed a mixture of .318 mole of N-phenethyl aziridine and 0.5 gram of $RuO_2 \cdot xH_2O$ (60.13 percent by weight of $RuO_2$, $x$ is approximately 5). The charged pressure reactor was placed in a mechanical rocker and heated to a temperature of 99°–102° C. under a hydrogen pressure of 1000 p.s.i.g. for 21 hours and 47 minutes. The reactor was removed from the rocker and cooled. The contents of the reactor were removed and analyzed. The product contained 1-(2-cyclohexylethyl)aziridine (a 41 percent yield based upon the weight of the N-phenethyl aziridine charged to the reactor) as determined by vapor phase chromatography and infrared analysis. Elemental analysis of the separated product was as follows:

1-(2-CYCLOHEXYLETHYL)AZIRIDINE ($C_{10}H_{19}N$)

| | Theoretical (Percent by Weight) | Actual (Percent by Weight) |
|---|---|---|
| C | 78.36 | 77.78 |
| H | 12.50 | 12.88 |
| N | 9.14 | 9.22 |

Refractive index (Na D line, 20° C.) = 1.4667.

*Example II*

Using a procedure similar to that of Example I, a mixture of .318 mole of N-phenethyl aziridine and 0.5 gram of $RuO_2 \cdot xH_2O$ (60.13 percent by weight $RuO_2$, $x$ is approximately equal to 5) was heated in a pressure vessel for 3 hours and 20 minutes at a temperature of from 145° to 158° C. under a hydrogen pressure of 1000 p.s.i.g. The reaction product contained 1-(2-cyclohexylethyl) aziridine (13.1 percent yield based upon the amount of N-phenethyl aziridine charged to the reactor) as determined by vapor phase chromatography and infrared analysis.

In a similar experiment using commercially available finely divided ruthenium metal powder without ruthenium oxide, no reduction of N-phenethyl aziridine to 1-(2-cyclohexylethyl)aziridine occurred.

We claim as our invention:

1. A method of hydrogenating an N-aralkyl aziridine compound without extensive degradation of reactants and products which comprises contacting an N-aralkyl aziridine compound with hydrogen in the presence of a ruthenium oxide catalyst.

2. A method of selectively hydrogenating an N-aralkyl aziridine compound which comprises contacting (I) a compound of the formula

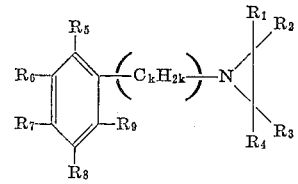

wherein $k$ is an integer of from 1 to 4 and each of $R_{1-9}$ is independently a group of the formula $(C_mH_{2m})H$ wherein $m$ is an integer of from 0 to 4, and (II) hydrogen, in the presence of a catalytic amount of ruthenium oxide under a hydrogen pressure of from 500 p.s.i.g. to 2000 p.s.i.g. at a temperature of from 75° to 250° C.

3. The method of claim 2 wherein the temperature is from about 95° to 105° C.

4. The method of claim 2 wherein the temperature is from about 150° to 200° C.

5. A method of preparing a compound of the formula (I)

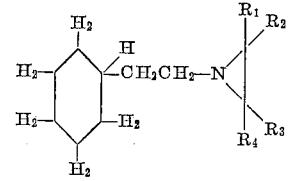

which comprises contacting a compound of the formula (II)

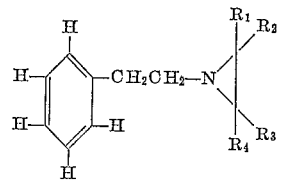

in which each of $R_1$, $R_2$, $R_3$ and $R_4$ in Formulae I and II is independently selected from the group consisting of the hydrogen atom and a lower alkyl group of from 1 to 4 carbon atoms, with hydrogen under a pressure of from about 500 p.s.i.g. to 2000 p.s.i.g. at a temperature of from about 95° to 105° C. in the presence of a catalytically effective amount of ruthenium oxide and separating the compound (I) from the resulting reaction product.

6. A method of selectively hydrogenating N-phenethyl aziridine without extensive degradation of the reactants and products which comprises contacting N-phenethyl aziridine with hydrogen in the presence of ruthenium dioxide at a temperature of from about 75° to 250° C. under a hydrogen pressure of from 500 p.s.i.g. to 2000 p.s.i.g. for a time period of up to 24 hours.

No references cited.

ALEX MAZEL, *Primary Examiner.*

ALTON D. ROLLINS, *Assistant Examiner.*